US010609627B2

(12) United States Patent
Zhao et al.

(10) Patent No.: US 10,609,627 B2
(45) Date of Patent: Mar. 31, 2020

(54) IDENTIFYING COMMUNICATIONS TECHNOLOGY FROM CELLULAR BROADCAST DATA

(71) Applicant: Verizon Patent and Licensing Inc., Basking Ridge, NJ (US)

(72) Inventors: Hui Zhao, Marlboro, NJ (US); Samirkumar Patel, Middlesex, NJ (US); Lily Zhu, Parsippany, NJ (US); Andrew E. Youtz, Princeton, NJ (US); Christopher M. Schmidt, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/963,714

(22) Filed: Apr. 26, 2018

(65) Prior Publication Data

US 2019/0335384 A1 Oct. 31, 2019

(51) Int. Cl.
*H04W 4/00* (2018.01)
*H04W 48/10* (2009.01)
*H04W 48/16* (2009.01)
*H04W 8/00* (2009.01)
*H04W 76/11* (2018.01)
*H04W 88/06* (2009.01)

(52) U.S. Cl.
CPC ......... *H04W 48/10* (2013.01); *H04W 8/005* (2013.01); *H04W 48/16* (2013.01); *H04W 76/11* (2018.02); *H04W 88/06* (2013.01)

(58) Field of Classification Search
CPC .... H04B 17/318; H04W 8/005; H04W 24/10; H04W 48/10; H04W 48/16; H04W 48/18; H04W 56/001; H04W 76/11; H04W 76/15; H04W 88/06
See application file for complete search history.

(56) References Cited

U.S. PATENT DOCUMENTS

| 8,538,421 | B2 * | 9/2013 | Brisebois | H04L 41/0893 455/432.3 |
|---|---|---|---|---|
| 9,456,337 | B2 | 9/2016 | Amerga et al. | |
| 2018/0368016 | A1 * | 12/2018 | Lee | H04W 24/10 |
| 2019/0053136 | A1 * | 2/2019 | Lee | H04L 1/1614 |
| 2019/0069205 | A1 * | 2/2019 | Lee | H04W 36/00835 |
| 2019/0069226 | A1 * | 2/2019 | Lee | H04B 17/30 |
| 2019/0069229 | A1 * | 2/2019 | Lee | H04W 36/0085 |

(Continued)

OTHER PUBLICATIONS

GPP TSG-RAN WG2 #100, R2-1713443, 5G indicator for EN-DC, Ericsson, 21 pages, Dec. 2017.*

(Continued)

*Primary Examiner* — Frank Duong (57) ABSTRACT

A device can receive a system information data from a cell and obtain cell metadata from the system information data, the cell metadata including at least one of: a cell identifier, or a cellular parameter. The device can determine, based on the cell metadata, that the cell is of a particular cell type of multiple cell types, including: a fifth generation long term evolution (LTE) cell type, a fifth generation new radio (NR) sub-6 GHz cell type, and a fifth generation NR millimeter wave cell type. Based on the particular cell type, the device can perform an action, including causing display of an indicator on a display of the device.

20 Claims, 6 Drawing Sheets

(56) References Cited

U.S. PATENT DOCUMENTS

| | | |
|---|---|---|
| 2019/0069325 A1 | 2/2019 | Yerramalli et al. |
| 2019/0215885 A1* | 7/2019 | Wu .................. H04W 76/15 |
| 2019/0223091 A1 | 7/2019 | Huang-Fu et al. |
| 2019/0268833 A1 | 8/2019 | Kwok |

OTHER PUBLICATIONS

3GPP TSG-RAN WG2 NR Ad hoc 0118, R2-1801529, Clarification of the UpperLayerIndication in SIB2 (RILNo C008), CATT, 6 pages, Jan. 2018.*

Ericsson, Introducing 5G indication in LTE RRC SIB, 3GPP TSG-RAN WG2 #99bis, 20 pages, Oct. 2017.*

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.8.1 (Jan. 2018), 644 pages, Jan. 2018.

* cited by examiner

FIG. 4

IDENTIFYING COMMUNICATIONS TECHNOLOGY FROM CELLULAR BROADCAST DATA

BACKGROUND

Telecommunications components included in user equipment, such as mobile phones, personal computers, tablet computers, wearable computing devices, and/or the like, can be capable of communicating wirelessly using a radio transmitter and a radio receiver. Different types of radios exist for different forms of wireless communication, including long term evolution (LTE) radios for LTE communications, 3G radios for 3G communications, code division multiple access (CDMA) radios for CDMA communications, and/or the like.

DETAILED DESCRIPTION OF PREFERRED EMBODIMENTS

The following detailed description of example implementations refers to the accompanying drawings. The same reference numbers in different drawings can identify the same or similar elements.

Often, electronic devices, such as mobile devices (e.g., user equipment, such as a smart phone, tablet computer, laptop computer, and/or the like) include components for wirelessly communicating with other electronic devices over a variety of radio telecommunications networks operating using a variety of frequencies and protocols. In a situation where a mobile device communicates with a cellular base station (e.g., to access a telecommunications network), the mobile device can determine the type of base station to which it is connected (e.g., CDMA, 3G, LTE, 5G New Radio, and/or the like) based on the modem/radio used by the mobile device to connect to the base station. However, communications technology can differ in a situation where the same modem/radio is used; for example, cellular modem/radio can be used in multiple different types of communications technology, including 4G LTE communications, fifth generation (5G) LTE communications, 5G new radio (NR) sub-6 GHz communications, 5G NR millimeter wave communications, and/or the like.

Some implementations, described herein, provide a mobile device that is capable of using system information (e.g., included in a system information block (SIB)) broadcast by a base station (e.g., a cellular base station, or cell) to distinguish between the different types of communications technology used by the base station. For example, the mobile device can receive system information (e.g., master information block (MIB), SIB1, SIB2, and/or the like) from the base station. The system information can include cell metadata (e.g., information capable of being used by the mobile device for a variety of purposes) such as a cellular identifier, one or more cellular parameters (e.g., upperLayerIndication parameter, MIB data, and/or the like), and/or the like. In some implementations, cell metadata may be included in a message received by the mobile device separately from a SIB (e.g., metadata such as a RestrictDCNR parameter included in an AttachAccept or TrackingAreaUpdateAccept message). In this situation, the message that is received separately may be described herein as being included in system information, though it is provided separately from an MIB broadcast, SIB broadcast, and/or the like. The mobile device can use the cell metadata to determine which type of cell the system information was broadcast from. For example, the cell metadata can provide an indication as to whether the base station is of a particular type of cell, such as a 4G LTE cell, 5G LTE cell, 5G NR sub-6 GHz cell, 5G NR millimeter wave cell, and/or the like. Based on the type of cell the system information was broadcast from, the mobile device can perform one or more actions (e.g., connect to the cell, ignore the cell, display a cell type indicator, and/or the like).

In this way, a mobile device can determine the specific communications technology used by a cell from information regularly broadcast by the cell (e.g., system information broadcast data), facilitating a variety of actions being taken by the mobile device. By determining the communications technology used from system information data, the mobile device can perform a variety of actions without requiring additional information to be provided by the cell, including connecting to the cell based on its type (e.g., prioritizing one type of cell over another), displaying a cell type indicator (e.g., providing a user of the mobile device with information indicating which type of cell the mobile device is in communication with), and/or the like. Several different stages of the process for determining communications technology from cellular broadcast data are automated, which can improve speed and efficiency of the process and conserve computing resources (e.g., processor resources, memory resources, and/or the like). Furthermore, implementations described herein use a rigorous, computerized process to perform tasks or roles that were not previously performed. Finally, automating the process for determining communications technology from cellular broadcast data conserves computing resources (e.g., processor resources, memory resources, and/or the like) that would otherwise be wasted by using multiple different types of communications data and/or devices with different software, protocols, and configurations.

Figure 1A:
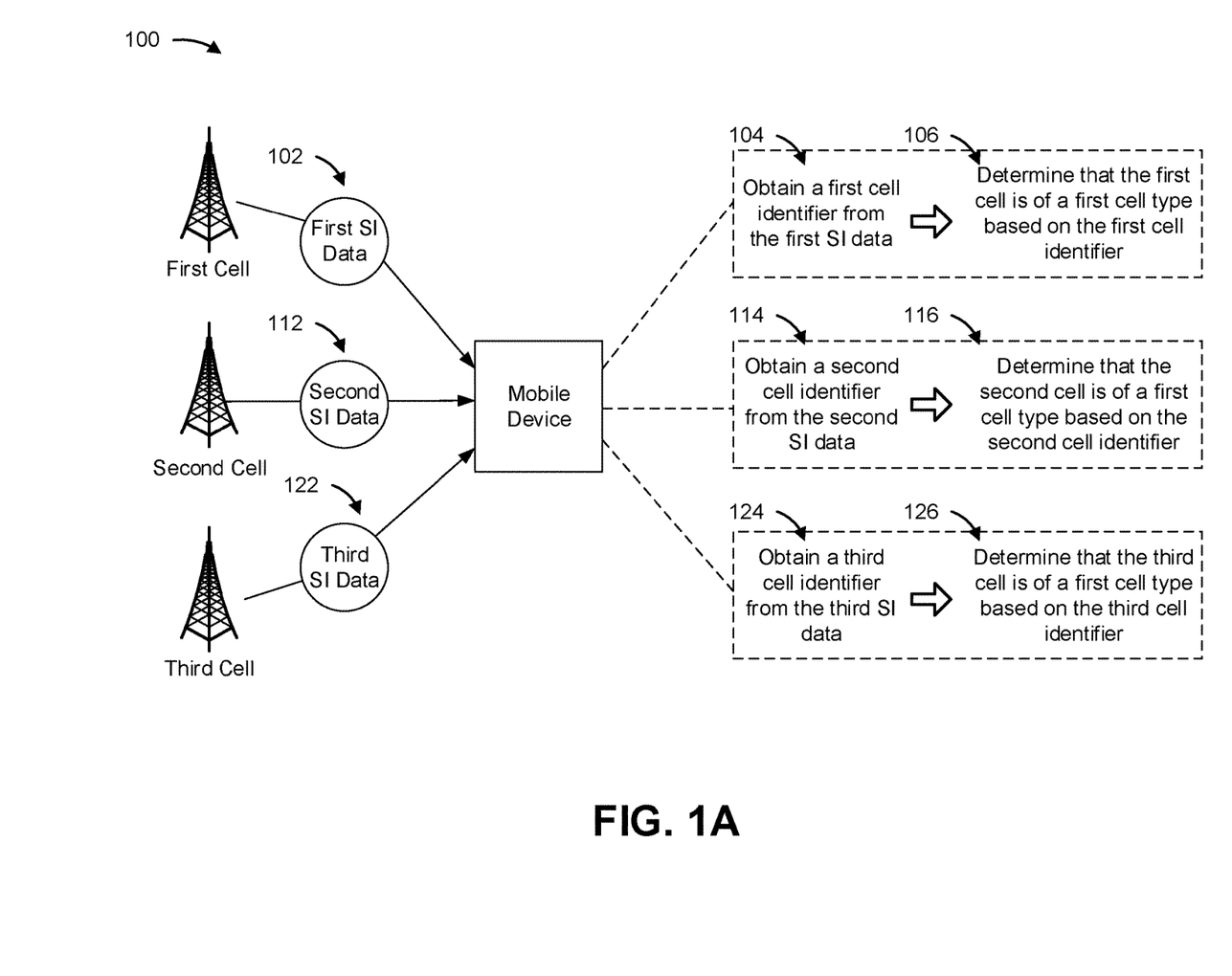
FIGS. 1A-1C are diagrams of example implementations described herein.

FIG. 1A is a diagram of an example implementation 100 described herein. As shown in FIG. 1A, example implementation 100 includes three cells (e.g., a first cell, second cell, and third cell) and a mobile device. In some implementations, each cell can be associated with a separate base station. In some implementations, one or more of the cells can share a base station (e.g., a single base station can be associated with multiple cells). As noted above, each is capable of providing the mobile device with access to a cellular network.

As shown by reference number 102, the mobile device receives first system information data from the first cell. The first system information data can include, for example, MIB data, SU data, SIB1 data, SIB2 data, and/or the like, which is periodically broadcast by the first cell in a manner designed to enable the mobile device (or another mobile device) to connect to the first cell. The first system information data can include cell metadata, such as an Evolved Cell Global Identifier (ECGI) that identifies the first cell (e.g., 20 bit evolved NodeB (eNB) ID, 8 bit cell identifier (CI), and/or the like), and/or one or more cellular parameters, such as an upperLayerIndication parameter, MIB spare bits (e.g., 5 bits included in an MIB), and/or the like.

As shown by reference number 104, the mobile device obtains a first cell identifier from the first system information data. For example, the mobile device can obtain an eNB ID from a MIB included in the first system information data. As shown by reference number 106, the mobile device determines that the first cell is of a first cell type based on the first cell identifier. For example, based on the eNB ID being within a predetermined range of identifiers associated with a particular type of cell, the mobile device can determine that the first cell is of the first cell type. By way of example, an eNB ID of the first cell (alone or in combination with a CI) might be within a first range that is associated with a 5G LTE cell type. Based on the association, the mobile device can determine that the first cell is a 5G LTE cell.

As shown by reference number 112, the mobile device receives second system information data from the second cell. As with the first system information data, the second system information data can include information periodically broadcast by the second cell in a manner designed to enable the mobile device to connect to the second cell, such as an ECGI that identifies the second cell. As shown by reference number 114, the mobile device obtains a second cell identifier (e.g., an ECGI of the second cell, such as an eNB ID) from the second system information data. As shown by reference number 116, the mobile device determines that the second cell is of a second cell type based on the second cell identifier. For example, based on the eNB ID of the second cell being included in a predetermined set of eNB identifiers of cells associated with the second cell type, the mobile device can determine that the second cell is a 5G NR sub-6 GHz cell type.

As shown by reference number 122, the mobile device receives third system information data from the third cell. As with the first system information data and second system information data, the third system information data can include information periodically broadcast by the third cell in a manner designed to enable the mobile device to connect to the third cell, such as an ECGI that identifies the third cell. As shown by reference number 124, the mobile device obtains a third cell identifier (e.g., an ECGI of the third cell, such as an eNB ID) from the third system information data. As shown by reference number 126, the mobile device determines that the third cell is of a third cell type based on the third cell identifier. For example, based on the eNB ID of the third cell matching a pattern (e.g., regular expression based pattern) associated with the third cell type, the mobile device can determine that the third cell is a 5G NR millimeter wave cell type.

In this way, the mobile device can determine the type of cellular communications technology used by a cell/base station based on cellular identification metadata included in system information data broadcast by the cell/base station. Determining the type of cellular communications technology can enable the mobile device to take a variety of actions based on the type of cellular communications technology identified. In some implementations, the mobile device can cause display (e.g., on a display of the mobile device) of an indicator that indicates the type of cellular technology. For example, the mobile device can cause display of a 5G LTE indicator, a 5G NR sub-6 GHz indicator, a 5G NR millimeter indicator, or another type of indicator. A visual indicator can be designed to provide a user of mobile device with knowledge of the type of cell to which the mobile device is connected. The indicator can also provide an indication of the type of cellular technology to one or more applications operating on the mobile device, enabling the application(s) to take action based on the type of cellular technology the mobile device is using to communicate with a network. For example, an application operating on the mobile device can use information identifying the type of cell to determine whether the mobile device should connect to the cell (e.g., certain types of cells might be preferred, or disfavored, by a particular mobile device and/or application).

In this way, the mobile device can use system information data broadcast by a cell to determine a cell type associated with the cell. Based on the cell type, the mobile device can take a variety of actions designed to improve user experience and/or the functionality of the mobile device.

Figure 1B:
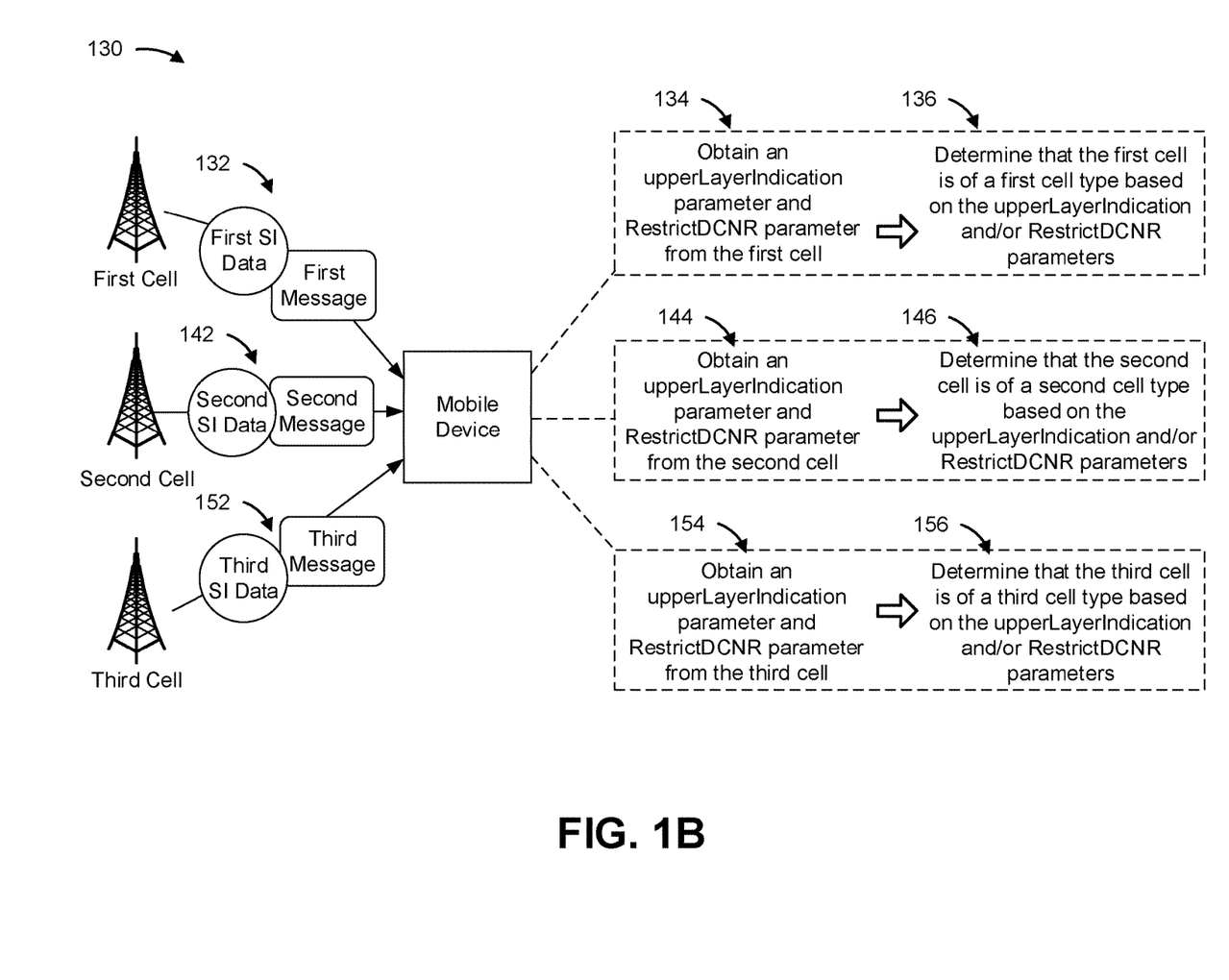

FIG. 1B is a diagram of an example implementation 130 described herein. As shown in FIG. 1B, example implementation 130 includes three cells (e.g., a first cell, second cell, and third cell) and the mobile device (e.g., the same mobile device depicted in example implementation 100 or a different mobile device). The cells can be the same or similar to the cells described above, e.g., with reference to example implementation 100 of FIG. 1A.

As shown by reference number 132, the mobile device receives first system information data and a first message from the first cell. The first system information data can include, for example, MIB data, SIB1 data, SIB2 data, and/or the like, which is periodically broadcast by the first cell in a manner designed to enable the mobile device (or another mobile device) to connect to the first cell. For example, the first system information data can include cell metadata, such as one or more cellular parameters, such as an upperLayerIndication parameter, MIB spare bits (e.g., 5 bits included in an MIB), and/or the like. The first message may include a downlink message originating from the cellular network (e.g., the network to which the first cell provides access), such as an AttachAccept message, TrackingAreaUpdateAccept message, and/or the like. The first message may also include cell metadata, such as one or more parameters that may be used to determine which type of cell the first cell is associated with, such as a RestrictDCNR parameter.

As shown by reference number 134, the mobile device obtains an upperLayerIndication parameter and a RestrictDCNR parameter from the first cell (e.g., in the first SI data and the first message). For example, the mobile device can obtain a first value (e.g., a TRUE or FALSE value, or another value) associated with the upperLayerIndication parameter, and a second value (e.g., a TRUE or FALSE value, or another value) associated with the RestrictDCNR parameter. As shown by reference number 136, the mobile device determines that the first cell is of a first cell type based on the upperLayerIndication and/or RestrictDCNR parameter. For example, based on the upperLayerIndication parameter being FALSE, the mobile device can determine that the first cell is of the first cell type. By way of example, a FALSE upperLayerIndication parameter might be associated with a 4G cell type. Based on the association, the mobile device can determine that the first cell is a 4G LTE cell. In the foregoing example, the value of the RestrictDCNR parameter did not matter, though in some implementations, the determination may be made based on a combination of the values associated with the upperLayerIndication and RestrictDCNR parameters (e.g., as described below).

For example, the mobile device might use a RestrictDCNR parameter to determine whether new radio communications are available. In a situation where the RestrictDCNR parameter is TRUE (e.g., NR communications are not available), the mobile device can determine that the cell is a non-NR cell type. As described below, in a situation where the RestrictDCNR parameter is FALSE (e.g., NR communications are available), the mobile device can determine that the cell is of a 5G NR type (e.g., depending on values associated with other parameters, such as the upperLayerIndication parameter). Other types of parameters, and/or combinations of parameters, included in the same system information data or different system information data, can be used to determine the cell type associated with the first cell (or other cells).

As shown by reference number 142, the mobile device receives second system information data and a second message from the second cell. As with the first system information data, the second system information data can include information periodically broadcast by the second cell in a manner designed to enable the mobile device to connect to the second cell, including one or more cellular parameters, such as the upperLayerIndication parameter, MIB spare bits (e.g., 5 bits included in an MIB), and/or the like. As with the first message, the second message may include other cell metadata, such as a RestrictDCNR parameter. As shown by reference number 144, the mobile device obtains a value for the upperLayerIndication parameter and RestrictDCNR parameter from the second cell. As shown by reference number 146, the mobile device determines that the second cell is of a second cell type based on the upperLayerIndication and/or RestrictDCNR parameter. For example, based on the upperLayerIndicator parameter being TRUE, and the RestrictDCNR parameter being FALSE, the mobile device can determine that the second cell is a 5G NR type (e.g., 5G NR sub-6 GHz cell type or 5G NR millimeter way type).

As shown by reference number 152, the mobile device receives third system information data and a third message from the third cell. As with the first system information data and second system information data, the third system information data can include information periodically broadcast by the third cell in a manner designed to enable the mobile device to connect to the third cell, including one or more cellular parameters, such as the upperLayerIndication parameter, MIB spare bits (e.g., 5 bits included in an MIB), and/or the like. As with the first and second message, the third message may include other cell metadata, such as a RestrictDCNR parameter. As shown by reference number 154, the mobile device obtains a value for the upperLayerIndication parameter and RestrictDCNR parameter from the third cell. As shown by reference number 156, the mobile device determines that the third cell is of a third cell type based on the upperLayerIndication and/or RestrictDCNR parameters. For example, based on the upperLayerIndication parameter being TRUE, and RestrictDCNR parameter being TRUE, the mobile device can determine that the second cell is a 5G LTE type, but not a 5G NR type. While described as using the upperLayerIndication and RestrictDCNR parameters, a variety of parameters can be included in system information data (or other messages) and can be used to determine the type of cellular technology associated with a cell.

In this way, the mobile device can determine the type of cellular communications technology used by a cell/base station based on cellular identification metadata included in system information data broadcast by the cell/base station. As described above, with reference to FIG. 1A, determining the type of cellular communications technology can enable the mobile device to take a variety of actions based on the type of cellular communications technology identified. The action(s) taken can be designed, for example, to improve the user experience and/or functionality of the mobile device.

Figure 1C:
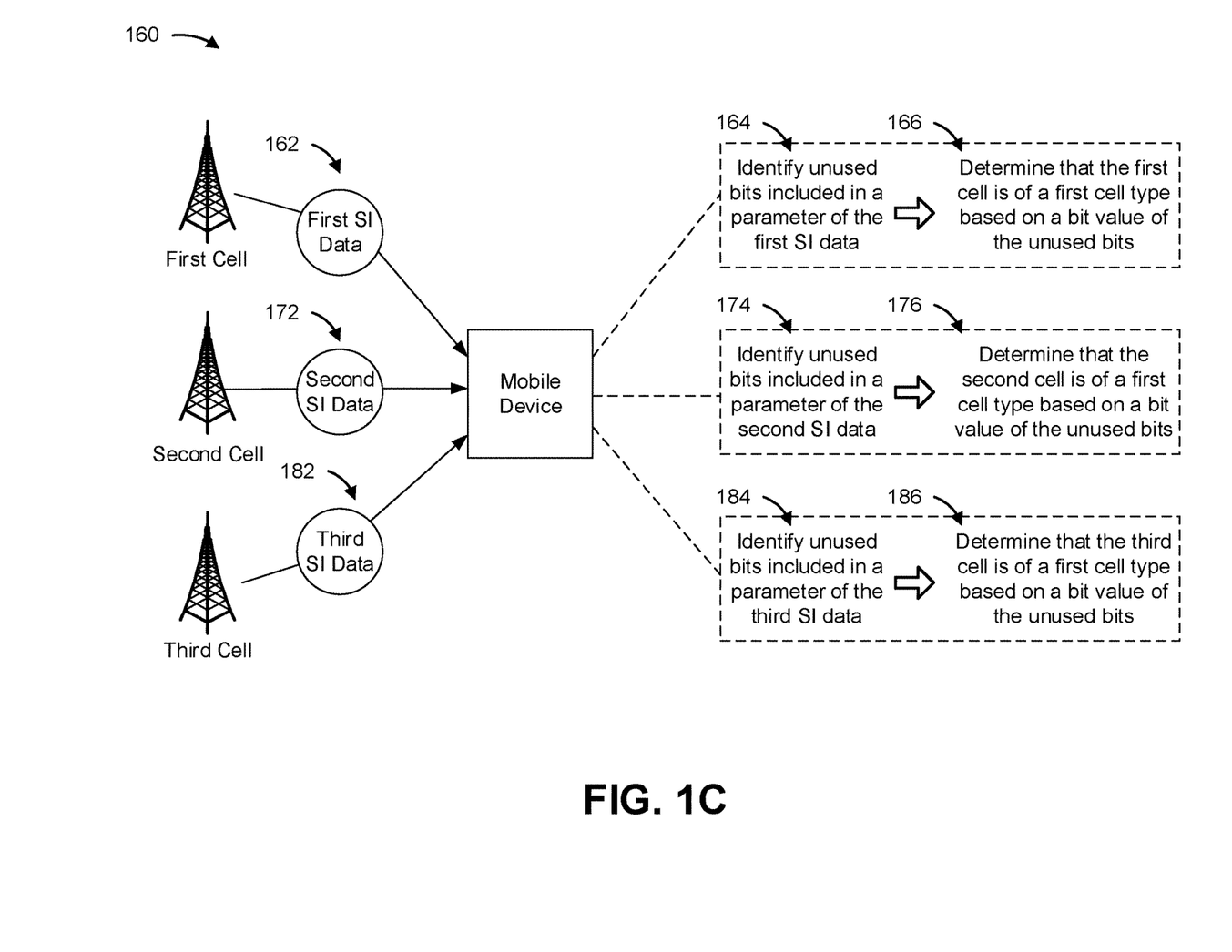

FIG. 1C is a diagram of an example implementation 160 described herein. As shown in FIG. 1C, example implementation 160 includes three cells (e.g., a first cell, second cell, and third cell) and the mobile device (e.g., the same mobile device depicted in example implementations 100 or 130 or a different mobile device). The cells can be the same or similar to the cells described above, e.g., with reference to example implementations 100 or 130 of FIG. 1A or 1B.

As shown by reference number 162, the mobile device receives first system information data from the first cell. The first system information data can include, for example, MIB data, SIB1 data, SIB2 data, and/or the like, which is periodically broadcast by the first cell in a manner designed to enable the mobile device (or another mobile device) to connect to the first cell. For example, the first system information data can include cell metadata, such as MIB data, including MIB spare bits (e.g., 5 bits included in the MIB), other unused bits associated with MIB data and/or another SIB parameter, and/or the like.

As shown by reference number 164, the mobile device identifies unused bits from the first system information data. For example, the mobile device can identify the spare bits parameter of a MIB as unused bits (e.g., from predetermined configuration information associated with the mobile device). As shown by reference number 166, the mobile device determines that the first cell is of a first cell type based on a bit value of the unused bits. For example, based on the unused bits being associated with a predetermined value (e.g., a predetermined bit arrangement), the mobile device can determine that the first cell is of the first cell type. By way of example, a particular bit value specified by the spare bits parameter might be associated with a 5G LTE cell type. Based on the association, the mobile device can determine that the first cell is a 5G LTE cell.

As shown by reference number 172, the mobile device receives second system information data from the second cell. As with the first system information data, the second system information data can include information periodically broadcast by the second cell in a manner designed to enable the mobile device to connect to the second cell, such MIB spare bits, other parameters with unused and/or spare bits, and/or the like. As shown by reference number 174, the mobile device identifies the unused bits from the second system information data. As shown by reference number 176, the mobile device determines that the second cell is of a second cell type based on a bit value of the unused bits. For example, based on the spare bits value matching a predetermined bit pattern associated with a 5G NR sub-6 GHz cell type, the mobile device can determine that the second cell is a 5G NR sub-6 GHz cell type.

As shown by reference number 182, the mobile device receives third system information data from the third cell. As with the first system information data and second system information data, the third system information data can include information periodically broadcast by the third cell in a manner designed to enable the mobile device to connect to the third cell, such as MIB spare bits, other parameters with unused and/or spare bits, and/or the like. As shown by reference number 184, the mobile device identifies the unused bits from the third system information data. As shown by reference number 186, the mobile device determines that the third cell is of a third cell type based on a bit value of the unused bits. For example, based on the spare bits value being within a predetermined range of bit values associated with a 5G NR millimeter wave cell type, the mobile device can determine that the second cell is a 5G NR millimeter wave cell type.

In this way, the mobile device can determine the type of cellular communications technology used by a cell/base station based on cellular identification metadata included in system information data broadcast by the cell/base station. As described above, with reference to FIG. 1A, determining the type of cellular communications technology can enable the mobile device to take a variety of actions based on the type of cellular communications technology identified. The action(s) taken can be designed, for example, to improve the user experience and/or functionality of the mobile device.

While examples above described determining the type of cellular technology from among three types of cellular technology, in some implementations, more (or fewer) types of cellular technology can be determined from cellular data broadcast by a cell/base station. In some implementations, other information can also be used to determine cellular technology, including data identifying the type of radio through which the mobile device receives cellular data. For example, cellular data can be received via a 3G radio, LTE radio, a Wi-Fi radio, and/or the like, and the source of the cellular data can be used to determine a subset of cellular technology from which the mobile device can determine a type of cellular technology associated with the cell/base station that provided the cellular data.

While the examples above describe the mobile device as determining the type of cellular technology used by a cell/base station, in some implementations a cell/base station can take one or more actions designed to facilitate identification of the cellular technology being used to communicate system information data to the mobile device. For example, the cell/base station can set the cellular identifier(s), MIB parameters, SIB parameters, and/or the like, to a predetermined state, enabling the mobile device, when receiving the cellular identifier(s), MIB parameters, SIB parameters, and/or the like, to rely on the system information data to make the determination regarding the cellular technology used by the cell/base station.

In this way, a mobile device can determine the specific communications technology used by a cell from information regularly broadcast by the cell (e.g., MIB data, SIB data, and/or the like), facilitating a variety of actions being taken by the mobile device. By determining the communications technology used from system information data, the mobile device can perform a variety of actions without requiring additional information to be provided by the cell, including connecting to the cell based on its type (e.g., prioritizing one type of cell over another), displaying a cell type indicator (e.g., providing a user of the mobile device with information indicating which type of cell the mobile device is in communication with), and/or the like. Several different stages of the process for determining communications technology from cellular broadcast data are automated, which can improve speed and efficiency of the process and conserve computing resources (e.g., processor resources, memory resources, and/or the like). Furthermore, implementations described herein use a rigorous, computerized process to perform tasks or roles that were not previously performed. Finally, automating the process for determining communications technology from cellular broadcast data conserves computing resources (e.g., processor resources, memory resources, and/or the like) that would otherwise be wasted by using multiple different types of communications data and/or devices with different software, protocols, and configurations.

As indicated above, FIGS. 1A-1C are provided merely as examples. Other examples are possible and can differ from what was described with regard to FIGS. 1A-1C.

Figure 2:
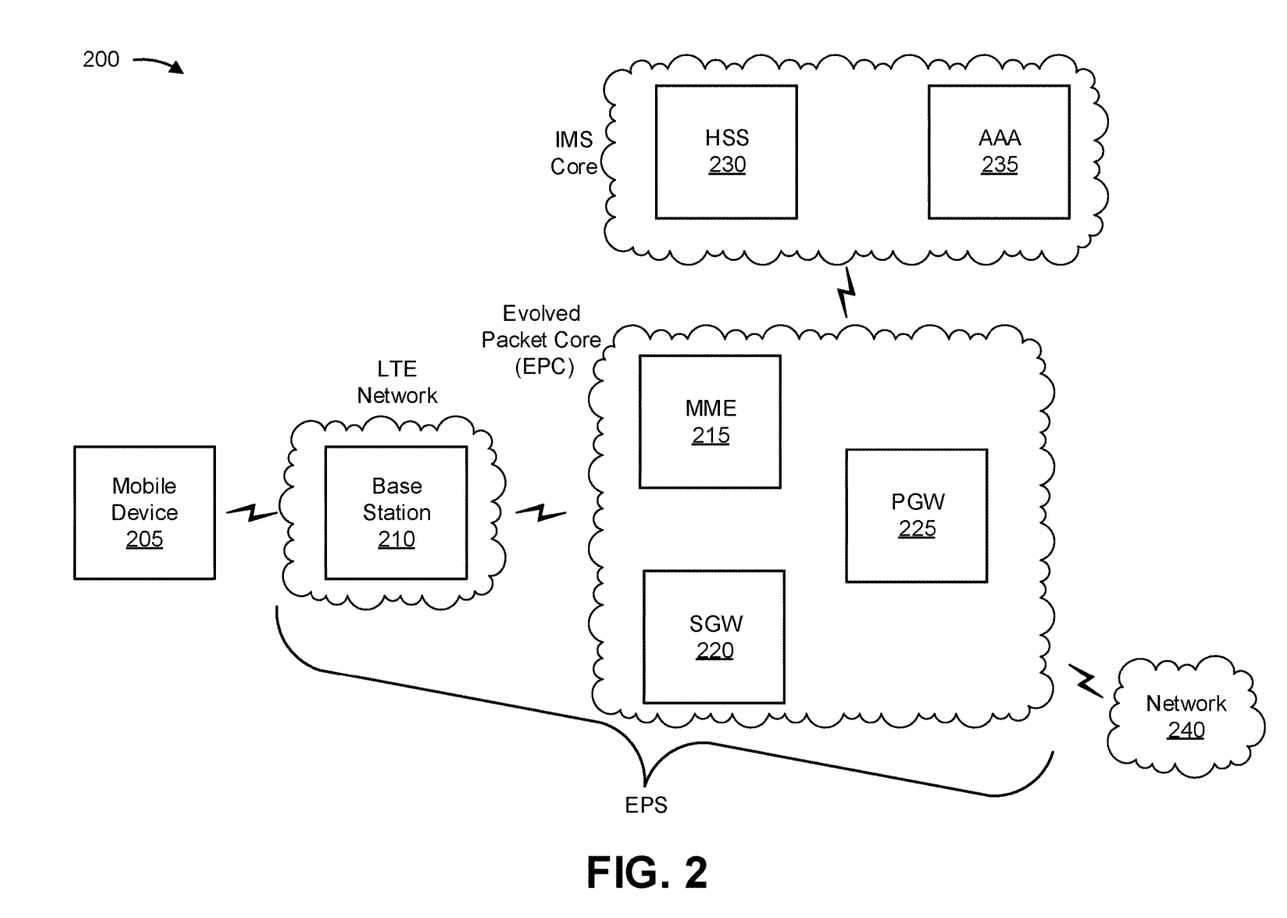
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a mobile device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; and a network 240. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 (e.g. cells) that take the form of evolved Node Bs (eNBs) via which mobile device 205 communicates with the EPC. The EPC can include MME 215, SGW 220, and/or PGW 225 that enable mobile device 205 to communicate with network 240 and/or an Internet protocol (IP) multimedia subsystem (IMS) core. The IMS core can include HSS 230 and/or AAA 235, and can manage device registration and authentication, session initiation, etc., associated with mobile devices 205. HSS 230 and/or AAA 235 can reside in the EPC and/or the IMS core.

Mobile device 205 can include one or more devices capable of communicating with base station 210 and/or a network (e.g., network 240). For example, mobile device 205 can include a wireless communication device, a radiotelephone, a personal communications system (PCS) terminal (e.g., that can combine a cellular radiotelephone with data processing and data communications capabilities), a smart phone, a wearable computing device, a laptop computer, a tablet computer, a personal gaming system, and/or a similar device. Mobile device 205 can send traffic to and/or receive traffic from network 240 (e.g., via base station 210, SGW 220, and/or PGW 225).

Base station 210 (e.g., also referred to as a cell, or cell site) can include one or more devices capable of transferring traffic, such as audio, video, text, and/or other traffic, destined for and/or received from mobile device 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with the LTE network. Base station 210 can send traffic to and/or receive traffic from mobile device 205 via an air interface. In some implementations, base station 210 can include a small cell base station, such as a base station of a microcell, a picocell, and/or a femtocell.

MME 215 can include one or more devices, such as one or more server devices, capable of managing authentication, activation, deactivation, and/or mobility functions associated with mobile device 205. In some implementations, MME 215 can perform operations relating to authentication of mobile device 205. Additionally, or alternatively, MME 215 can facilitate the selection of a particular SGW 220 and/or a particular PGW 225 to serve traffic to and/or from mobile device 205. MME 215 can perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 can select another MME (not pictured), to which mobile device 205 should be handed off (e.g., when mobile device 205 moves out of range of MME 215).

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. SGW 220 can also receive traffic from network 240 and/or other network devices, and can send the received traffic to mobile device 205 via base station 210. Additionally, or alternatively, SGW 220 can perform operations associated with handing off mobile device 205 to and/or from an LTE network.

PGW 225 can include one or more devices capable of providing connectivity for mobile device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to mobile device 205 via SGW 220 and base station 210. PGW 225 can record data usage information (e.g., byte usage), and can provide the data usage information to AAA 235.

HSS 230 can include one or more devices, such as one or more server devices, capable of managing (e.g., receiving, generating, storing, processing, and/or providing) information associated with mobile device 205. For example, HSS 230 can manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 can include one or more devices, such as one or more server devices, that perform authentication, authorization, and/or accounting operations for communication sessions associated with mobile device 205. For example, AAA 235 can perform authentication operations for mobile device 205 and/or a user of mobile device 205 (e.g., using one or more credentials), can control access, by mobile device 205, to a service and/or an application (e.g., based on one or more restrictions, such as time-of-day restrictions, location restrictions, single or multiple access restrictions, read/write restrictions, etc.), can track resources consumed by mobile device 205 (e.g., a quantity of voice minutes consumed, a quantity of data consumed, etc.), and/or can perform similar operations.

Network 240 can include one or more wired and/or wireless networks. For example, network 240 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
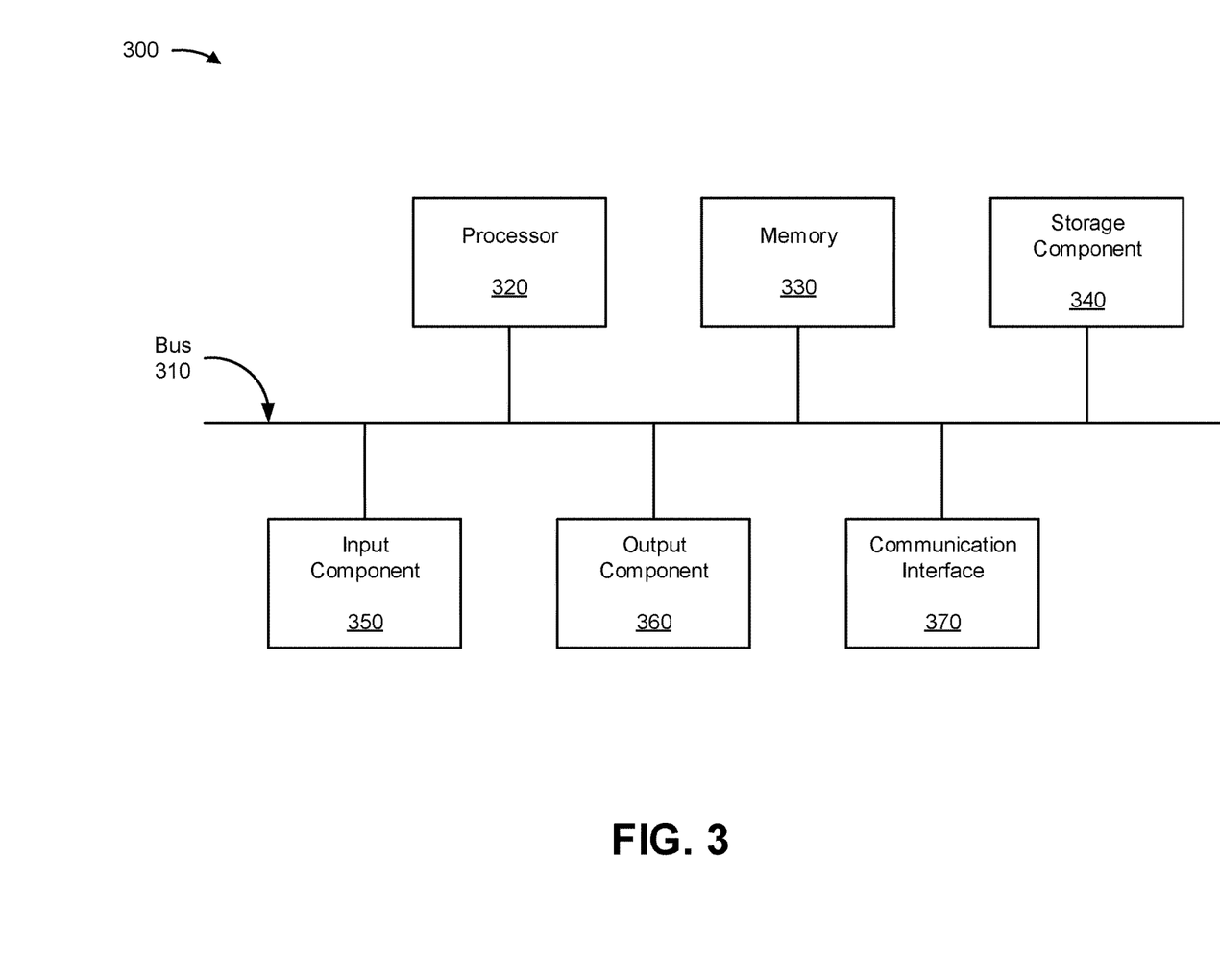
FIG. 3 is a diagram of example components of one or more devices of FIG. 2.

FIG. 3 is a diagram of example components of a device 300. Device 300 can correspond mobile device 205, a base station 210, an MME 215, a SGW 220, a PGW 225, an HSS 230, and/or an AAA 235. In some implementations, mobile device 205, a base station 210, an MME 215, a SGW 220, a PGW 225, an HSS 230, and/or an AAA 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
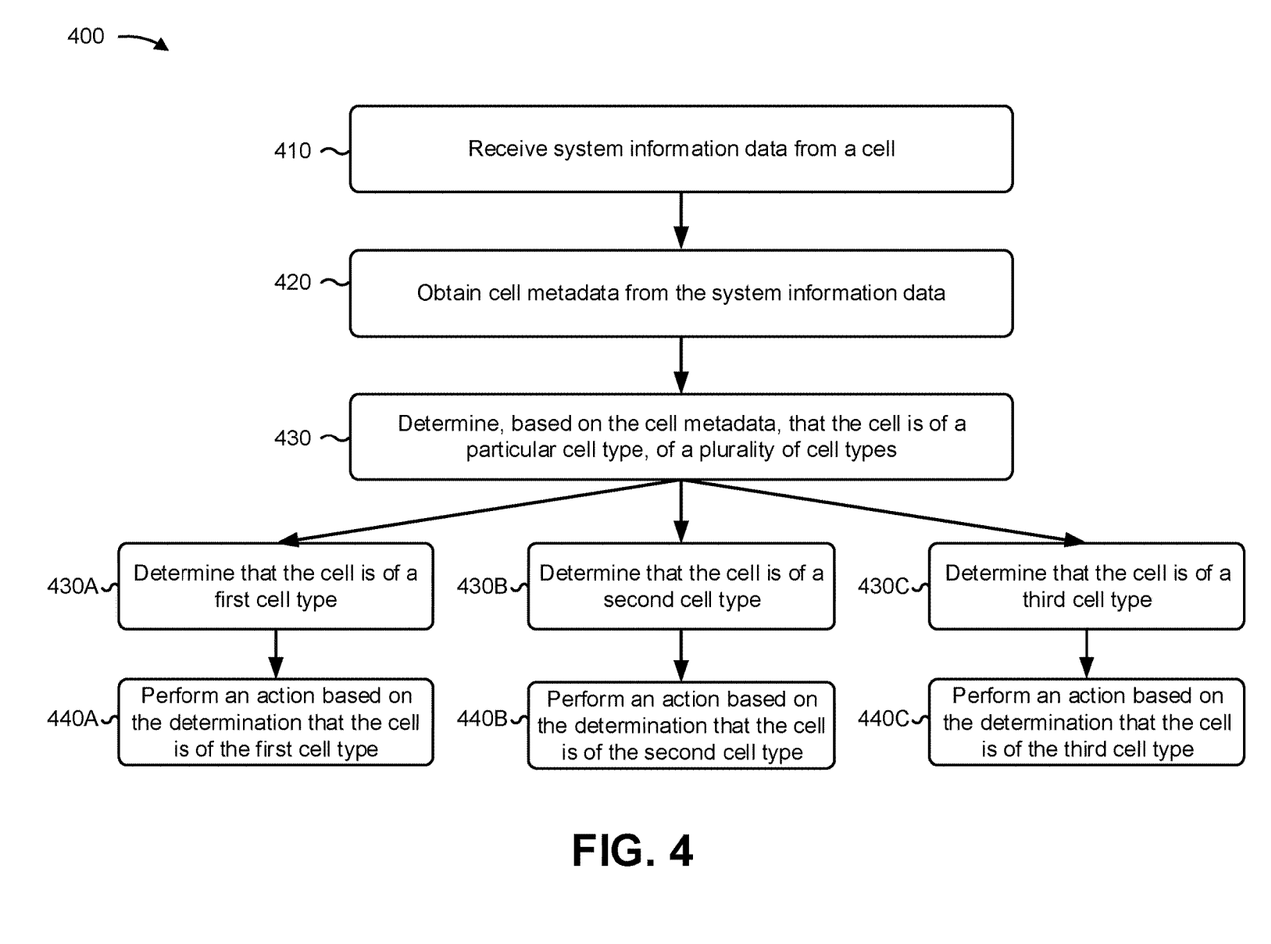
FIG. 4 is a flow chart of an example process for identifying communications technology from cellular broadcast data.

FIG. 4 is a flow chart of an example process 400 for identifying communications technology from cellular broadcast data. In some implementations, one or more process blocks of FIG. 4 can be performed by mobile device 205. In some implementations, one or more process blocks of FIG. 4 can be performed by another device or a group of devices separate from or including mobile device 205, such as a base station 210, an MME 215, a SGW 220, a PGW 225, an HSS 230, and/or an AAA 235.

As shown in FIG. 4, process 400 can include receiving system information data from a cell (block 410). For example, a mobile device (e.g., mobile device 205, using processor 320, memory 330, storage component 340, input component 350, communications interface 370, and/or the like) can receive system information data from a cell (e.g., a cell associated with base station 210), as described, for example, in connection with FIGS. 1A-1C.

As further shown in FIG. 4, process 400 can include obtaining cell metadata from the system information data (block 420). For example, the mobile device (e.g., mobile device 205, using processor 320, memory 330, storage component 340, input component 350, communications interface 370, and/or the like) can obtain cell metadata from the system information data, the cell metadata including at least one of: a cell identifier, or a cellular parameter, as described, for example, in connection with FIGS. 1A-1C.

As further shown in FIG. 4, process 400 can include determining, based on the cell metadata, that the cell is of a particular cell type, of a plurality of cell types (block 430). For example, the mobile device (e.g., mobile device 205, using processor 320, memory 330, storage component 340, and/or the like) can determine, based on the cell metadata, that the cell is of a particular cell type, of a plurality of cell types, as described, for example, in connection with FIGS. 1A-1C. As shown at block 430A, the mobile device determines that the cell is of a first cell type. As shown at block 430B, the mobile device determines that the cell is of a second cell type. As shown at block 430C, the mobile device determines that the cell is of a third cell type.

As further shown in FIG. 4, process 400 can include performing an action based on the determination that the cell is of the particular cell type (blocks 440A, 440B, 440C). For example, the mobile device (e.g., mobile device 205, using processor 320, memory 330, storage component 340, input component 350, output component 360, communications interface 370, and/or the like) can perform an action based on the determination that the cell is of the particular cell type, as described, for example, in connection with FIGS. 1A-1C. As shown at block 440A, the mobile device performs an action based on the determination that the cell is of the first cell type. As shown at block 440B, the mobile device performs an action based on the determination that the cell is of the second cell type. As shown at block 440C, the mobile device performs an action based on the determination that the cell is of the third cell type. The action may include, in some implementations, causing display of an indicator on the mobile device.

Process 400 can include additional implementations, such as any single implementation or any combination of implementations described below.

In some implementations, the cell metadata includes multiple cellular parameters, and the determination is based on the multiple cellular parameters.

In some implementations, the cell metadata include the cell identifier, and determining that the cell is of the particular cell type of the plurality of cell types includes determining that the cell identifier is within a range of cell identifiers associated with the particular cell type.

In some implementations, the cell metadata includes a firstcellular parameter and a second cellular parameter, the first cellular parameter includes an upperLayerIndication parameter that is associated with a first value, the second cellular parameter includes a RestrictDCNR parameter that is associated with a second value, and determining that the cell is of the particular cell type of the plurality of cell types includes determining that the first and second value are associated with the particular cell type.

In some implementations, the cell metadata includes the cellular parameter, the cellular parameter includes unused bits, and determining that the cell is of the particular cell type of the plurality of cell types includes determining that at least one bit value of the unused bits is associated with the particular cell type.

In some implementations, performing the action based on the particular cell type includes causing display of an indicator on a display of the device, the indicator indicating that the device is in communication with the particular cell type. In some implementations, performing the action based on the particular cell type includes determining whether to connect to the cell.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information might be subject to consent of the individual to such activity, for example, through well known "opt-in" or "opt-out" processes as may be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below might directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, system information data from a cell;
   obtaining, by the device, cell metadata from the system information data,
      the cell metadata including
         a cellular parameter that includes unused bits; and
   determining, by the device and based on the cell metadata, that the cell is of a particular cell type of a plurality of cell types, based at least in part on determining that at least one bit value of the unused bits is associated with the particular cell type,
      the plurality of cell types including:
         a fifth generation long term evolution (LTE) cell type,
         a fifth generation new radio (NR) sub-6 GHz cell type, and
         a fifth generation NR millimeter wave cell type; and
   performing, by the device, an action based on the particular cell type,
      the action including causing display of an indicator on a display of the device.

2. The method of claim 1, wherein:
the cell metadata includes multiple cellular parameters; and
determining that the cell is of a particular cell type is based on the multiple cellular parameters.

3. The method of claim 1, wherein:
the cell metadata includes a cell identifier; and
determining that the cell is of the particular cell type of the plurality of cell types comprises:
   determining that the cell identifier is within a range of cell identifiers associated with the particular cell type.

4. The method of claim 1, wherein:
the cell metadata includes a first cellular parameter and a second cellular parameter;
the first cellular parameter includes an upperLayerindication parameter that is associated with a first value;
the second cellular parameter includes a RestrictDCNR parameter that is associated with a second value; and
determining that the cell is of the particular cell type of the plurality of cell types comprises:
   determining that the first value and second value are associated with the particular cell type.

5. The method of claim 1, wherein:
the cell metadata includes a cell identifier; and
determining that the cell is of the particular cell type of the plurality of cell types comprises:
   determining that the cell identifier matches a pattern associated with the particular cell type.

6. The method of claim 1, wherein the indicator indicates that the device is in communication with the particular cell type.

7. The method of claim 1, wherein performing the action based on the particular cell type comprises:
determining whether to connect to the cell.

8. A device comprising:
one or more memories; and one or more processors, communicatively coupled to the one or more memories, to:
  receive a system information data from a cell;
  obtain cell metadata from the system information data, the cell metadata including
    a cellular parameter that includes unused bits; and
  determine, based on the cell metadata, that the cell is of a particular cell type of a plurality of cell types, based at least in part on determining that at least one bit value of the unused bits is associated with the particular cell type,
    the plurality of cell types including:
      a fifth generation long term evolution (LTE) cell type,
      a fifth generation new radio (NR) sub-6 GHz cell type, and
      a fifth generation NR millimeter wave cell type; and
  perform an action based on the particular cell type,
    the action including causing display of an indicator on a display of the device.

9. The device of claim 8, wherein:
the cell metadata includes multiple cellular parameters; and
the one or more processors, when determining that the cell is of a particular cell type, are to:
  determine that the cell is of a particular cell type based on the multiple cellular parameters.

10. The device of claim 8, wherein:
the cell metadata includes a cell identifier; and
the one or more processors, when determining that the cell is of the particular cell type of the plurality of cell types, are to:
  determine that the cell identifier is within a range of cell identifiers associated with the particular cell type.

11. The device of claim 8, wherein:
the cell metadata includes a first cellular parameter and a second cellular parameter;
the first cellular parameter includes an upperLayerindication parameter that is associated with a first value;
the second cellular parameter includes a RestrictDCNR parameter that is associated with a second value; and
the one or more processors, when determining that the cell is of the particular cell type of the plurality of cell types, are to:
  determine that the first value and second value are associated with the particular cell type.

12. The device of claim 8, wherein:
the cell metadata includes a cell identifier; and
the one or more processors, when determining that the cell is of the particular cell type of the plurality of cell types, are to:
  determine that the cell identifier matches a pattern associated with the particular cell type.

13. The device of claim 8, wherein the indicator indicates that the device is in communication with the particular cell type.

14. The device of claim 8, wherein the one or more processors, when performing the action based on the particular cell type, are to:
  determine whether to connect to the cell.

15. A non-transitory computer-readable medium storing instructions, the instructions comprising:
  one or more instructions that, when executed by one or more processors, cause the one or more processors to:
    receive a system information data from a cell;
    obtain cell metadata from the system information data, the cell metadata including
      a cellular parameter that includes unused bits;
    determine, based on the cell metadata, that the cell is of a particular cell type of a plurality of cell types, based at least in part on determining that at least one bit value of the unused bits is associated with the particular cell type,
      the plurality of cell types including:
        a fifth generation long term evolution (LTE) cell type,
        a fifth generation new radio (NR) sub-6 GHz cell type, and
        a fifth generation NR millimeter wave cell type; and
    perform an action based on the particular cell type,
      the action including causing display of an indicator on a display of a device.

16. The non-transitory computer-readable medium of claim 15, wherein:
the cell metadata includes multiple cellular parameters; and
the one or more instructions that cause the one or more processors to determine that the cell is of a particular cell type cause the one or more processors to:
  determine that the cell is of a particular cell type based on the multiple cellular parameters.

17. The non-transitory computer-readable medium of claim 15, wherein:
the cell metadata includes a cell identifier; and
the one or more instructions further cause the one or more processors to:
  determine that the cell identifier is within a range of cell identifiers associated with the particular cell type.

18. The non-transitory computer-readable medium of claim 15, wherein:
the cell metadata includes a first cellular parameter and a second cellular parameter;
the cellular parameter includes an upperLayerindication parameter that is associated with a first value;
the second cellular parameter includes a RestrictDCNR parameter that is associated with a second value; and
the one or more instructions further cause the one or more processors to:
  determine that the first value and second value are associated with the particular cell type.

19. The non-transitory computer-readable medium of claim 15, wherein the action includes determining whether to connect to the cell.

20. The non-transitory computer-readable medium of claim 15, wherein the indicator indicates that the device is in communication with the particular cell type.

* * * * *